US012682612B2

(12) United States Patent
Marri et al.

(10) Patent No.: US 12,682,612 B2
(45) Date of Patent: Jul. 14, 2026

(54) WEAK SUPERVISED TRAINING DATA FOR IMAGE TAGGING MODELS

(71) Applicant: ADOBE INC., San Jose, CA (US)

(72) Inventors: Venkata Naveen Kumar Yadav Marri, Newark, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 358 days.

(21) Appl. No.: 18/313,642

(22) Filed: May 8, 2023

(65) Prior Publication Data
US 2024/0378863 A1      Nov. 14, 2024

(51) Int. Cl.
G06V 10/774      (2022.01)
G06T 9/00      (2006.01)
G06V 20/70      (2022.01)

(52) U.S. Cl.
CPC .............. G06V 10/774 (2022.01); G06T 9/00 (2013.01); G06V 20/70 (2022.01)

(58) Field of Classification Search
None
See application file for complete search history.

(56) References Cited

U.S. PATENT DOCUMENTS

| | | | | |
|---|---|---|---|---|
| 10,803,231 | B1 * | 10/2020 | Wang | G06N 3/08 |
| 2020/0380403 | A1 * | 12/2020 | Aggarwal | G06V 10/82 |
| 2021/0271707 | A1 * | 9/2021 | Lin | G06F 40/216 |
| 2022/0121702 | A1 * | 4/2022 | Kale | G06N 3/04 |
| 2023/0154213 | A1 * | 5/2023 | Gao | G06V 10/25 |
| | | | | 382/159 |

OTHER PUBLICATIONS

Interactive Weak Supervision: Learning Useful Heuristics for Data Labeling, by Boecking et al., arXiv: 2012.06046v2 [cs. LG] Jan. 25, 2021 (Year: 2021).*
1Radford, et al., "Learning Transferable Visual Models From Natural Language Supervision", arXiv preprint arXiv:2103.00020v1 [cs.CV] Feb. 26, 2021, pp. 1-48.

* cited by examiner

*Primary Examiner* — Vikkram Bali
(74) *Attorney, Agent, or Firm* — F. CHAU & ASSOCIATES, LLC

(57) ABSTRACT

Systems and methods for image tagging are provided. One aspect of the systems and methods includes encoding an image and a tag of the image using a multimodal encoder to obtain an image embedding and a text embedding, respectively. Another aspect of the systems and methods includes generating training data for a machine learning model by filtering a plurality of image-tag pairs based on a similarity between the image embedding and the text embedding. Another aspect of the systems and methods includes training the machine learning model using the training data.

16 Claims, 6 Drawing Sheets

Encode an image and a tag of the image using a multimodal encoder to obtain an image embedding and a text embedding, respectively ⟍ 505

Generate training data for a machine learning model by filtering a set of image-tag pairs based on a similarity between the image embedding and the text embedding ⟍ 510

Train the machine learning model using the training data ⟍ 515

⟍ 500

305 Generate image

310 Image

315 Tag image

320 Upload tagged image to database

325 Tagged image

{ Tag }

300

415

| Other Image Tagger | |
|---|---|
| Tag | Confidence Score |
| Elephant | 0.991 |
| Animal | 0.783 |
| Mammal | 0.698 |
| Trunk | 0.664 |
| Wildlife | 0.655 |
| Zoo | 0.623 |
| Wild | 0.610 |
| Baby | 0.603 |
| Large | 0.6 |
| Statue | 0.6 |

410

| Image Processing Apparatus | |
|---|---|
| Tag | Confidence Score |
| Office | 0.852 |
| Elephant | 0.752 |
| Table | 0.661 |
| Desk | 0.648 |
| Trunk | 0.635 |
| Animal | 0.630 |
| Workplace | 0.624 |
| Computer | 0.613 |
| Room | 0.590 |
| Work | 0.587 |

400

405

Encode an image and a tag of the image using a multimodal encoder to obtain an image embedding and a text embedding, respectively ⟍505

Generate training data for a machine learning model by filtering a set of image-tag pairs based on a similarity between the image embedding and the text embedding ⟍510

Train the machine learning model using the training data ⟍515

⟍500

Obtain user-interaction data for an image and a tag of the image ⟍605

Generate training data for a machine learning model by filtering a set of image-tag pairs based on the user-interaction data ⟍610

Train the machine learning model using the training data ⟍615

⟍600

WEAK SUPERVISED TRAINING DATA FOR IMAGE TAGGING MODELS

BACKGROUND

The following relates generally to machine learning, and more specifically to machine learning for image tagging.

Digital image processing generally refers to the process of making changes to a digital image or metadata of the digital image using a computer or other electronic device. A computer or other electronic device may use an algorithm, a processing network, etc. to make changes to a digital image or metadata of the digital image. In some cases, image processing software may be used for various image processing tasks, such as image editing, image generation, image tagging, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

SUMMARY

The present disclosure describes systems and methods for image tagging. Embodiments of the present disclosure include an image processing apparatus configured to generate one or more tags for an image. The image processing apparatus may obtain a set of images and a set of tags associated with the set of images. Because some tags associated with an image may be loosely related or irrelevant to the image, the image processing apparatus may filter the tags to obtain a more accurate set of image-tag pairs. In some examples, the image processing apparatus may filter the tags associated with an image based on semantic similarities between the image and the tags or based on user-interaction data for the image and the tags. The image processing apparatus may then train a machine learning model based on the filtered tags associated with an image, and the machine learning model may be used for image processing (e.g., image tagging) after training.

A method, apparatus, non-transitory computer readable medium, and system for machine learning for image tagging are described. One or more aspects of the method, apparatus, non-transitory computer readable medium, and system include encoding an image and a tag of the image using a multimodal encoder to obtain an image embedding and a text embedding, respectively; generating training data for a machine learning model by filtering a plurality of image-tag pairs based on a similarity between the image embedding and the text embedding; and training the machine learning model using the training data.

A method, apparatus, non-transitory computer readable medium, and system for machine learning for image tagging are described. One or more aspects of the method, apparatus, non-transitory computer readable medium, and system include obtaining user-interaction data for an image and a tag of the image; generating training data for a machine learning model by filtering a plurality of image-tag pairs based on the user-interaction data; and training the machine learning model using the training data.

An apparatus, system, and method for machine learning for image tagging are described. One or more aspects of the apparatus, system, and method include at least one memory component; at least one processing device coupled to the at least one memory component, wherein the processing device is configured to execute instructions stored in the at least one memory component; and a machine learning model including parameters stored in the at least one memory component, wherein the machine learning model is trained based on training data that is filtered based on a similarity between an image embedding of an image and a text embedding of a tag of the image and based on user-interaction data for the image and the tag.

DETAILED DESCRIPTION

Figure 1:
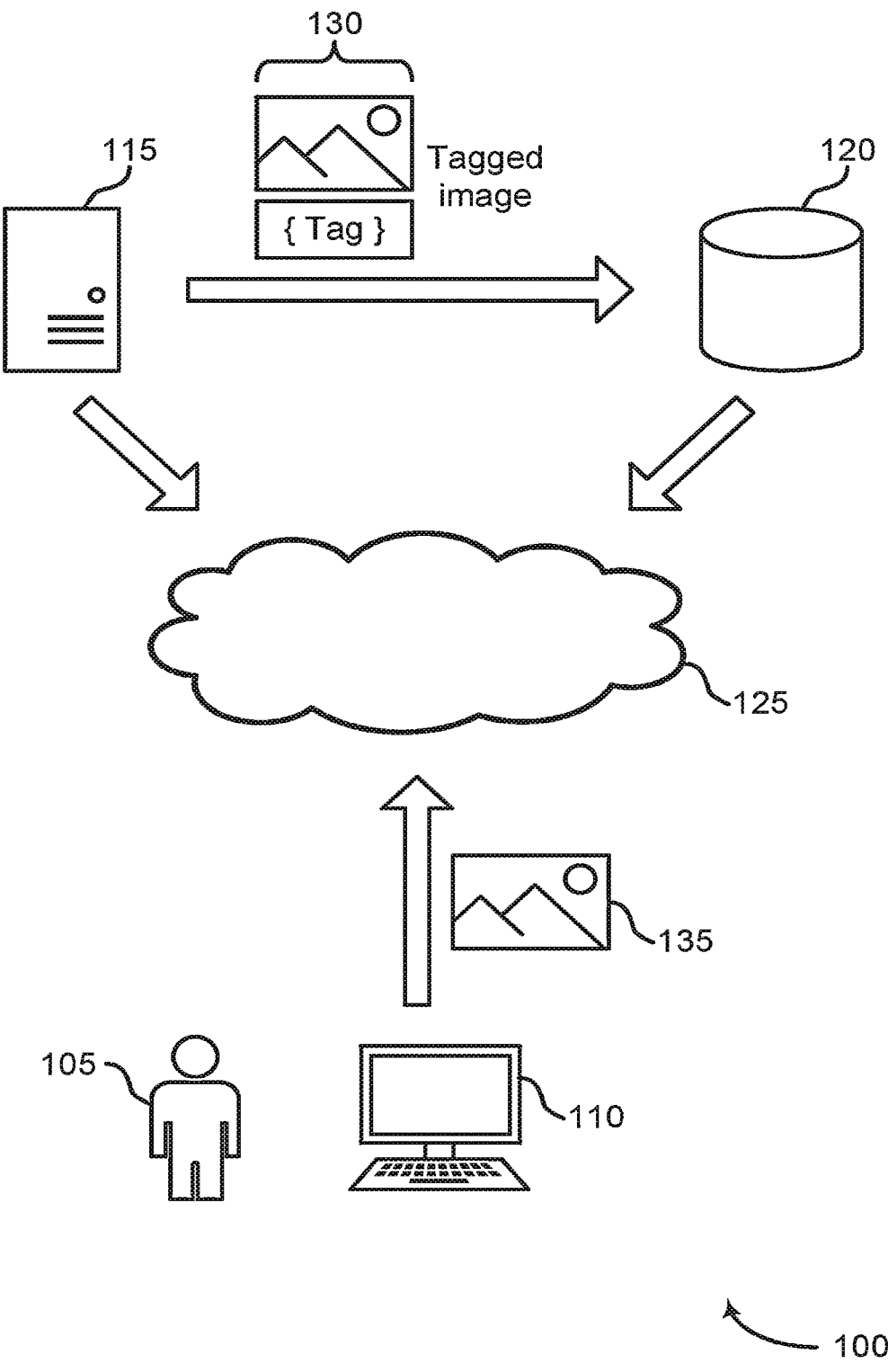
FIG. 1 shows an example of an image processing system according to aspects of the present disclosure.

The present disclosure describes systems and methods for image tagging. Embodiments of the present disclosure include an image processing apparatus configured to generate one or more tags for an image. The image processing apparatus may obtain a set of images and a set of tags associated with the set of images. Because some tags associated with an image may be loosely related or irrelevant to the image, the image processing apparatus may filter the tags to obtain a more accurate set of image-tag pairs. In some examples, the image processing apparatus may filter the tags associated with an image based on semantic similarities between the image and the tags or based on user-interaction data for the image and the tags. The image processing apparatus may then train a machine learning model based on the filtered tags associated with an image, and the machine learning model may be used for image processing (e.g., image tagging) after training.

Image tagging models provide metadata describing salient objects, styles, and abstract concepts associated with an image. Image tagging may be used in computer vision (e.g., to identify images) or in various downstream applications. One example of a downstream application for image tagging is text-based image retrieval. In a text-based image retrieval system, the quality of image retrieval may depend on the quality of tags associated with an image. Thus, an accurate image tagging model used to associated (e.g., pair) tags with images in a database may improve user experience. Another downstream application for image tagging is curating training data for training a machine learning model (e.g., a domain-specific image generation model). For instance, an image processing apparatus may curate large-scale training datasets for training an image generation model to generate images with specific content (e.g., backgrounds, faces, objects, etc.).

In some examples, to train an image tagging model at a large scale, it may be appropriate to train the image tagging model on labelled datasets that cover a wide range of tags (e.g., an entire tag vocabulary). However, such training may be prohibitively expensive if the labelled datasets are to be labelled by humans. Further, although some internet-scale search systems have user-provided tags associated with images (e.g., provided by a user when the user contributes an image), these user-provided tags may be noisy (e.g., if a search system is primarily driven by tags). For instance, contributors may provide a broad range of tags for an image including tags that may not be relevant to the image (e.g., to increase the chances that the image is returned in a search). Thus, although user-provided tags may contain relevant tags that can be used for training image tagging models, it may not be appropriate to use some of the user-provided tags for training image tagging models.

Embodiments of the present disclosure include an image processing apparatus configured to curate a dataset for training an image tagging model (e.g., or other image processing model). The image processing apparatus may support a data cleaning scheme for cleaning or filtering user-provided image-tag pairs to take advantage of corpuses of contributor-provided image tags. The data cleaning scheme may use semantic signals and/or behavioral signals (e.g., from user click-through data) to filter image-tag pairs and curate weak, supervised data at scale for training an image tagging model. That is, the image processing apparatus may use efficient data processing schemes to curate training data for training image tagging models by filtering noisy, user-contributed metadata.

An image tagging model trained using image-tag pairs filtered based on semantic signals and behavioral signals may be capable of generating or identifying precise tags for images. In some examples, the image tagging model may curate semantically relevant tags for an image based on semantic similarity between an image and a set of tags. In some examples, the image tagging model may curate tags for an image based on user behavior, such as the click-through rate for an image given a tag. As such, the image tagging model may be used to generate a dataset with suitable image-tag pairs for an image retrieval system such that the image retrieval system may return appropriate images to a user in response to a search request. The image tagging model may also be used to curate datasets for training machine learning models for domain-specific image processing.

Figure 2:
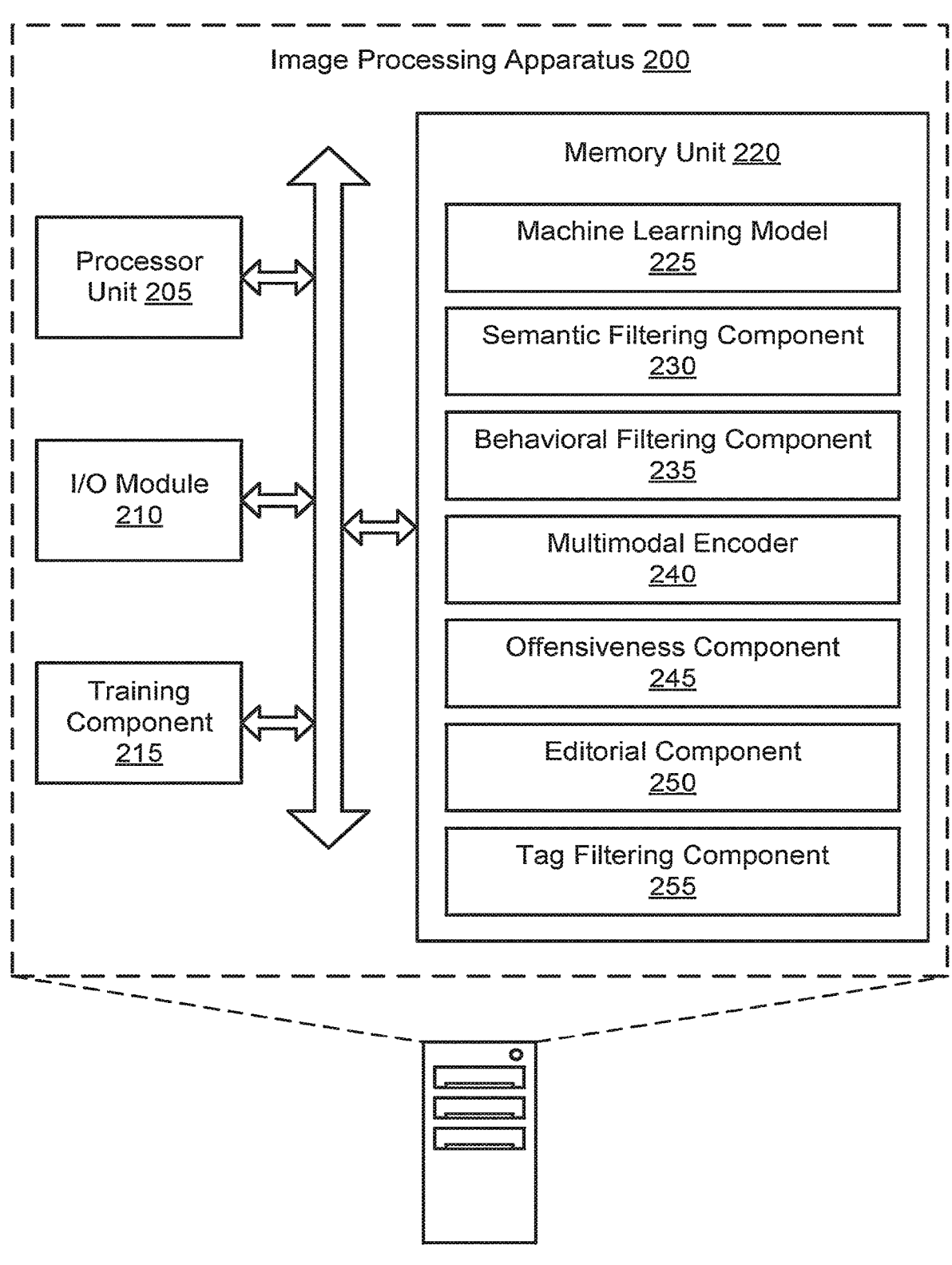
FIG. 2 shows an example of an image processing apparatus according to aspects of the present disclosure.

Details regarding the architecture of an example image processing apparatus are provided with reference to FIGS. 1 and 2. Examples processes for image tagging are provided with reference to FIGS. 3 and 4. Example training processes are described with reference to FIGS. 5 and 6.

Network Architecture

In FIGS. 1 and 2, a method, apparatus, non-transitory computer-readable medium, and system for machine learning for image tagging are described. One or more aspects of the method, apparatus, non-transitory computer-readable medium, and system include at least one memory component; at least one processing device coupled to the at least one memory component, wherein the processing device is configured to execute instructions stored in the at least one memory component; and a machine learning model including parameters stored in the at least one memory component, wherein the machine learning model is trained based on training data that is filtered based on a similarity between an image embedding of an image and a text embedding of a tag of the image and based on user-interaction data for the image and the tag.

Some examples of the method, apparatus, non-transitory computer-readable medium, and system further include a semantic filtering component configured to filter a plurality of image-tag pairs based on the similarity between the image embedding and the text embedding.

Some examples of the method, apparatus, non-transitory computer-readable medium, and system further include a behavioral filtering component configured to filter a plurality of image-tag pairs based on the user-interaction data for the image and the tag.

Some examples of the method, apparatus, non-transitory computer-readable medium, and system further include a multimodal encoder configured to generate the image embedding of the image and the text embedding of the tag.

Some examples of the method, apparatus, non-transitory computer-readable medium, and system further include an offensiveness component configured to compute an offensiveness value for the image or the tag.

Some examples of the method, apparatus, non-transitory computer-readable medium, and system further include an editorial component configured to compute an editorial value for the image or the tag.

Some examples of the method, apparatus, non-transitory computer-readable medium, and system further include a tag filtering component configured to filter a plurality of image-tag pairs based on a set of frequently-used tags.

FIG. 1 shows an example of an image processing system 100 according to aspects of the present disclosure. In one aspect, image processing system 100 includes user 105, user device 110, image processing apparatus 115, database 120, and cloud 125. Image processing apparatus 115 is an example of, or includes aspects of, the corresponding element described with reference to FIG. 2.

User 105 may interact with image processing software on user device 110. The user device 110 may communicate with the image processing apparatus 115 via the cloud 125. In some examples, user 105 may provide an image 135 to the image processing apparatus 115 via the user device 110, and the image processing apparatus 115 may generate a tag for the image provided by the user 105. The image processing apparatus 115 may then upload the tagged image 130 (e.g., the image and the tag) to the database 120. In some examples, the image processing apparatus 115 may also provide the tagged image 130 to the user 105 (e.g., via the user device 110). Thus, the image processing apparatus 115 may be used for image tagging to provide tags or metadata describing an image.

In some examples, the image processing apparatus 115 may be used to curate a dataset for training an image tagging model for image tagging. In order to curate large-scale training data for training the image tagging model, the image processing apparatus 115 may curate the dataset using weak supervision on top of contributor-provided tags. The image processing apparatus 115 may filter out assets (e.g., images and tags) that are inappropriate for model training. Filtering out inappropriate assets may be referred to as hard filtering. Once these assets are filtered out, the image processing apparatus 115 may perform semantic and behavioral based data curation. That is, after hard filtering, the image processing apparatus 115 may be used to curate a weakly-labelled dataset based on semantic analysis of images and tags, user behavior, or both.

The image processing apparatus 115 may use a stock dataset (e.g., a dataset of image-tag pairs) as a starting point for curating a dataset for training an image tagging model. In some examples, the stock dataset may include user-uploaded content. Because the stock dataset may include user-uploaded content, it may be appropriate to remove offensive or editorial (e.g., proprietary) content from the user-uploaded content to curate the dataset for training the image tagging model. Thus, the image processing apparatus 115 may perform hard filtering to remove offensive or editorial content from the stock dataset. The image processing apparatus 115 may leverage metadata fields available from the stock dataset (e.g., a stock search index) to perform the hard filtering.

The inappropriate content to be removed from the stock dataset may include not-safe-for-work (NSFW) content and editorial images. The stock dataset may contain a metadata field or an offensiveness value (e.g., content.offensive_level) for each image that specifies if the image has offensive material. In some examples, the image processing apparatus 115 may (e.g., using a pretrained NSFW image detector) filter out images that have an offensiveness value greater than zero (e.g., filter in images that have an offensiveness value equal to zero). The stock dataset may also contain a metadata field or an editorial value (e.g., a Boolean 'ised' flag) for each image that specifies if the image has editorial content. In some examples, the image processing apparatus 115 may filter out images that have the editorial value enabled or set to true (e.g., with the 'ised' flag enabled).

Once hard filtering is performed and inappropriate content is filtered out of the stock dataset, the image processing apparatus 115 may further filter a stock dataset to include frequently-used tags in the dataset for training an image tagging model. Filtering of the stock dataset to include frequently-used tags may be referred to as tag-based filtering. The stock dataset may include open vocabulary tags across multiple languages, and there may be a large number (e.g., 11 million) of unique contributor tags. The image processing apparatus 115 may restrict the contributor tag set to a certain size (e.g., 14 k tags) that may be most often used by users of the stock dataset (e.g., users searching the stock dataset or contributors to the stock dataset). That is, the image processing apparatus 115 may filter the stock dataset to include tags that have user demand data in the dataset for training an image tagging model.

Once tag-based filtering is performed and less frequently-used tags are filtered out of the stock dataset, the image processing apparatus may further filter the stock dataset based on semantic signals, behavioral signals, or both. That is, the image processing apparatus 115 may curate a weakly-labelled dataset for training an image tagging model based on semantic analysis of images and tags, user behavior, or both. The image processing apparatus 115 may combine semantic and behavioral signals to filter image-tag pairs and curate training data for training an image tagging model. Filtering a stock dataset based on semantic signals or semantic analysis may be referred to as semantic filtering, and filtering a stock dataset based on behavioral signals or user behavior may be referred to as behavioral filtering.

The image processing apparatus 115 may perform semantic filtering to filter out one or more tags for each image in a stock dataset based on semantic similarity between the tags and the image. Each image in the stock dataset may have a set of user-provided tags (e.g., contributor tags). The image processing apparatus 115 may compute an image embedding for an image (e.g., using a multimodal encoder) and a text embedding for each of the user-provided tags associated with the image (e.g., using the multimodal encoder). An image embedding and a text embedding can be vectors from different sources (e.g., image and text, respectively) in a same vector space. In some cases, image embeddings and text embeddings may be located in distinct areas of a vector space, but semantic similarities between image embeddings and text embeddings may still be identifiable. The image processing apparatus 115 may compute a similarity between the image embedding for the image and the text embedding for each of the user-provided tags. Because the image processing apparatus 115 may compute the image embedding and the text embeddings using a multimodal model, a similarity score between the image embedding of the image and a text embedding of a tag may represent how semantically similar the image is to the tag. If the similarity score is less than a threshold (e.g., 0.18), the image processing apparatus 115 may filter out or discard the tag from the training data for training an image tagging model (e.g., assume that the tag is not related to the image).

The image processing apparatus 115 may perform behavioral filtering to filter out one or more tags for each image in a stock dataset based on user behavior or user behavioral signals. In some examples, the image processing apparatus 115 may perform behavioral filtering once the stock dataset has been filtered using semantic filtering. When a user searches a query on a stock and clicks on a retrieved image, if any contributor tag of the image is part of the search query, a corresponding score of the contributor tag may be incremented. The score may then be used in ranking results on a stock. For curating a dataset for training an image tagging model, because tags describing an image may be desirable, tags associated with an image may also be filtered based on the score assigned to each tag in accordance with user click-through data.

In an example, each tag in a stock dataset (e.g., after tag-based filtering is performed) may be assigned a score based on user-click through data. If a tag is in a search query received from a user, and the user selects an image, a score assigned to the tag for the image may be incremented.

During behavioral filtering, the image processing apparatus 115 may identify a tag and a score assigned to the tag for each image. If the score of a tag for an image is in a threshold percentile (e.g., $75^{th}$ percentile) of the scores of the tag across all images, the image processing apparatus 115 may include the image-tag pair in the training data for an image tagging model. If the score of a tag for an image is not in (e.g., less than) the threshold percentile of the scores of the tag across all images, the image processing apparatus 115 may discard the image-tag pair from the training data for the image tagging model. In some examples, the image processing apparatus 115 may perform behavioral filtering on each of the tags in the stock dataset (e.g., each tag remaining after tag-based filtering). In some examples, the percentile of an image-tag pair may be determined without considering image-tag pairs where a score of the tag is zero or less than a threshold.

In some examples, the image processing apparatus 115 may include a server. A server provides one or more functions to users (e.g., a user 105) linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device (e.g., user device 110), a personal computer, a laptop computer, a mainframe computer, a super computer, or any other suitable processing apparatus.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database. In some cases, a user 105 interacts with a database controller. In other cases, a database controller may operate automatically without user interaction.

A cloud 125 is a computer network configured to provide on-demand availability of computer system resources, such as data storage and computing power. In some examples, the cloud 125 provides resources without active management by the user 105. The term "cloud" is sometimes used to describe data centers available to many users over the Internet. Some large cloud networks have functions distributed over multiple locations from central servers. A server is designated an edge server if the server has a direct or close connection to a user. In some cases, a cloud 125 is limited to a single organization. In other examples, the cloud 125 is available to many organizations. In one example, a cloud 125 includes a multi-layer communications network comprising multiple edge routers and core routers. In another example, a cloud 125 is based on a local collection of switches in a single physical location.

A user device 110 (e.g., a computing device) is a personal computer, laptop computer, mainframe computer, palmtop computer, personal assistant, mobile device, or any other suitable processing apparatus.

FIG. 2 shows an example of an image processing apparatus 200 according to aspects of the present disclosure. Image processing apparatus 200 is an example of, or includes aspects of, the corresponding element described with reference to FIG. 1. In one aspect, image processing apparatus 200 includes processor unit 205, I/O module 210, training component 215, and memory unit 220. In some aspects, the processor unit 205 is coupled to the memory unit 220, and the processing unit 205 is configured to execute instructions stored in the memory unit 220. In one aspect, the memory unit 200 includes machine learning model 225, semantic filtering component 230, behavioral filtering component 235, multimodal encoder 240, offensiveness component 245, editorial component 250, and tag filtering component 255.

Processor unit 205 comprises a processor. Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special-purpose components for modem processing, baseband processing, digital signal processing, or transmission processing.

Memory unit 210 comprises a memory including instructions executable by the processor. Examples of a memory unit 210 include random access memory (RAM), read-only memory (ROM), or a hard disk. Examples of memory units 210 include solid state memory and a hard disk drive. In some examples, memory is used to store computer-readable, computer-executable software including instructions that, when executed, cause a processor to perform various functions described herein. In some cases, the memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

In some examples, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In some examples, image processing apparatus 200 includes a computer-implemented convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, image processing apparatus 200 includes a transformer. A transformer or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feedforward layers. The inputs and outputs (target sentences) are first embedded into an n-dimensional space. Positional encoding of the different words (i.e., give every word/part in a sequence a relative position since the sequence depends on the order of its elements) is added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q corresponds to a matrix that contains the query (vector representation of one word in the sequence), K corresponds to all the keys (vector representations of all the words in the sequence), and V corresponds to the values, which are again the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights a.

In some examples, the multimodal encoder 240 is a contrastive language-image pre-training (CLIP) encoder. CLIP is a neural network-based model that is trained on a massive dataset of images and text (e.g., image captions). CLIP uses a technique called contrastive learning to learn underlying patterns and features of data. This allows CLIP to understand the relationships between different objects and scenes in images, and to classify the objects and scenes based on the content in the objects and scenes. CLIP is multimodal in that it can process and understand multiple types of data inputs, such as text and images. In some examples, CLIP can be fine-tuned for specific tasks, such as recognizing specific objects in images. CLIP's ability to generalize from one task to another and to be fine-tuned for new tasks makes it a highly versatile model.

In some examples, the training component 215 is implemented as software stored in memory and executable by a processor of a separate computing device, as firmware in the separate computing device, as one or more hardware circuits of the separate computing device, or as a combination thereof. In some examples, training component 215 is part of another apparatus other than image processing apparatus 200 and communicates with the image processing apparatus 200.

According to some aspects, multimodal encoder 240 encodes an image and a tag of the image to obtain an image embedding and a text embedding, respectively. According to some aspects, semantic filtering component 230 generates training data for a machine learning model 225 by filtering a set of image-tag pairs based on a similarity between the image embedding and the text embedding. According to some aspects, training component 215 trains the machine learning model 225 using the training data.

In some examples, semantic filtering component 230 computes a similarity score between the image embedding and the text embedding, where the filtering is based on the similarity score. According to some aspects, behavioral filtering component 235 obtains user-interaction data for the image and the tag, where the filtering is further based on the user-interaction data. In some examples, behavioral filtering component 235 computes, based on the user-interaction data, a behavioral score indicating user interactions with the image in response to searches corresponding to the tag, where the filtering is based on the behavioral score.

In some examples, multimodal encoder 240 receives the image and the tag of the image from a user upload.

According to some aspects, tag filtering component 255 identifies a set of frequently-used tags. In some examples, tag filtering component 255 selects the set of image-tag pairs based on the set of frequently-used tags. According to some aspects, offensiveness component 245 computes an offensiveness value for the image or the tag. In some examples, tag filtering component 255 selects the set of image-tag pairs based on the offensiveness value. According to some aspects, editorial component 250 computes an editorial value for the image or the tag. In some examples, tag filtering component 255 selects the set of image-tag pairs based on the editorial value.

In some examples, multimodal encoder 240 obtains an additional image. According to some aspects, machine learning model 225 generates an additional tag for the additional image.

According to some aspects, behavioral filtering component 235 obtains user-interaction data for an image and a tag of the image. In some examples, behavioral filtering component 235 generates training data for a machine learning model 225 by filtering a set of image-tag pairs based on the user-interaction data. According to some aspects, training component 215 trains the machine learning model 225 using the training data.

In some examples, behavioral filtering component 235 computes, based on the user-interaction data, a behavioral score indicating user interactions with the image in response to searches corresponding to the tag, where the filtering is based on the behavioral score.

According to some aspects, multimodal encoder 240 encodes the image and the tag using a multimodal encoder 240 to obtain an image embedding and a text embedding, respectively, where the filtering is further based on a similarity between the image embedding and the text embedding.

According to some aspects, semantic filtering component 230 computes a similarity score between the image embedding and the text embedding, where the filtering is based on the similarity score.

Image Tagging

Figure 3:
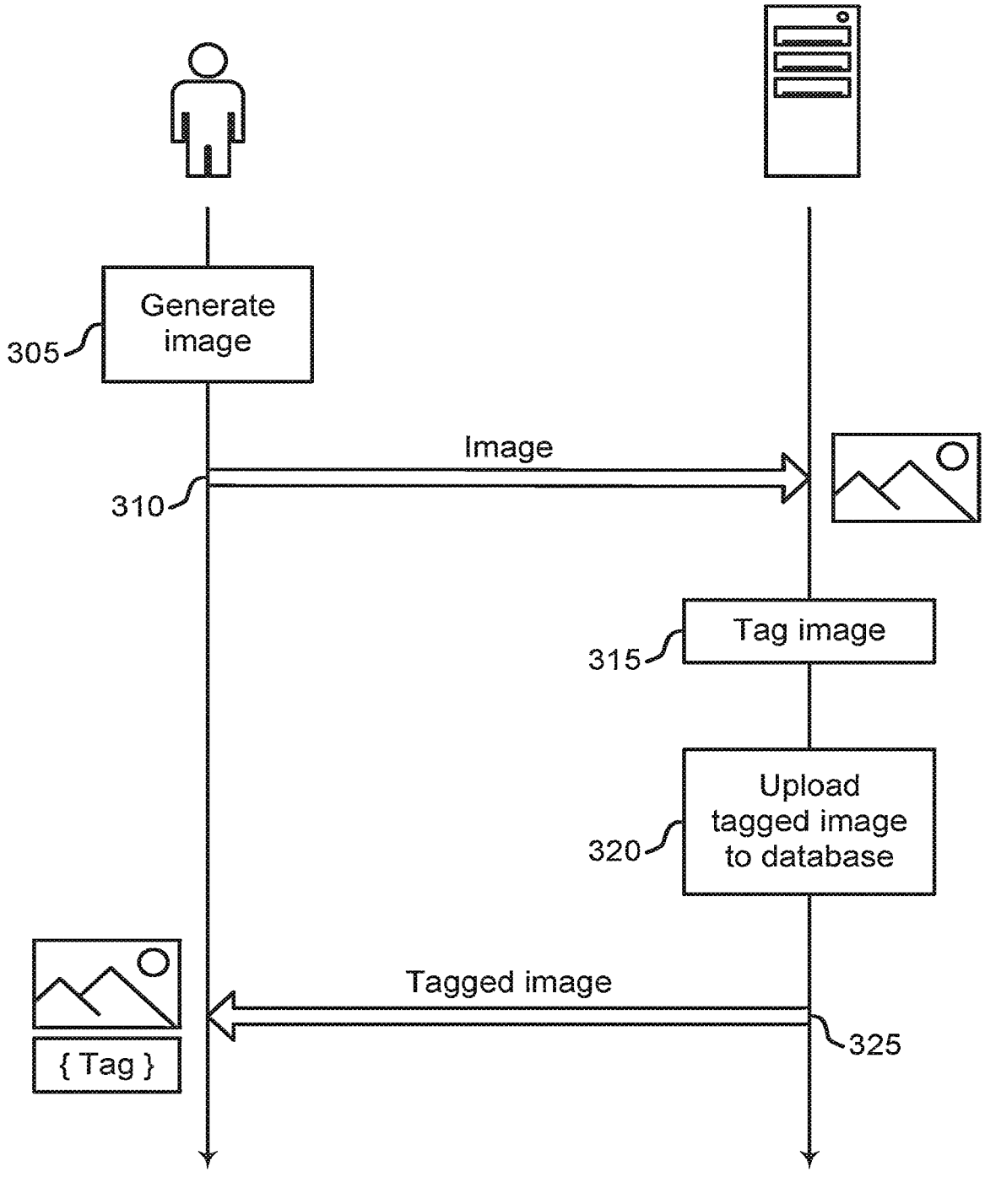
FIG. 3 shows an example of an image tagging process according to aspects of the present disclosure.

FIG. 3 shows an example of a process 300 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, a user generates an image. In some cases, the operations of this step refer to, or may be performed by, a user described with reference to FIG. 1. The user may generate the image using an image generation apparatus or using image processing software on a user device. The image generation apparatus may be a part of the image processing apparatus described with reference to FIGS. 1 and 2, and the user device may correspond to the user device described with reference to FIG. 1.

At operation 310, the user provides the image to the image processing apparatus. In some cases, the operations of this step refer to, or may be performed by, a user as described with reference to FIG. 1. The image processing apparatus may include an image tagging model (e.g., a machine learning model) trained for image tagging using training data curated by the image processing apparatus. The image processing apparatus may curate the training data for training the image tagging model based on performing hard filtering, tag-based filtering, semantic filtering, behavioral filtering, or a combination thereof on a stock dataset.

At operation 315, the image processing apparatus may assign a tag to the image provided by the user. In some cases, the operations of this step refer to, or may be performed by, an image processing apparatus as described with reference to FIGS. 1 and 2. A tag may refer to text associated with an image that may describe a feature of the image. An image tagging model of the image tagging apparatus may assign the tag to the image, and, in some examples, the tag may appropriately describe a salient feature or even a non-salient feature of the image.

At operation 320, the image processing apparatus may upload the tagged image to a database. In some cases, the operations of this step refer to, or may be performed by, an image processing apparatus as described with reference to FIGS. 1 and 2, and the image processing apparatus may upload the tagged image to a database as described with reference to FIG. 1.

At operation 325, the image processing apparatus may provide the tagged image to the user. In some cases, the operations of this step refer to, or may be performed by, an image processing apparatus as described with reference to FIGS. 1 and 2, and the user may be a user as described with reference to FIG. 1.

In some examples, the user may use the image processing apparatus to curate a dataset including accurately tagged images for various downstream applications. One downstream application for image tagging is curating training datasets that can be used for training domain-specific image generation models. In an example, training an image generation model that generates backgrounds may involve curating large-scale training datasets that do not contain images with text, people, objects, etc. An image tagging model that can classify backgrounds may be used for curating such datasets. Further, since the image tagging model may associate multiple tags (e.g., labels) with an image, the image tagging model can also be used for curating datasets for images with other content (e.g., faces, objects, etc.). That is, the image processing apparatus may avoid training a new classifier for curating datasets (e.g., including images of faces, objects, etc.) for individual downstream applications.

Figure 4:
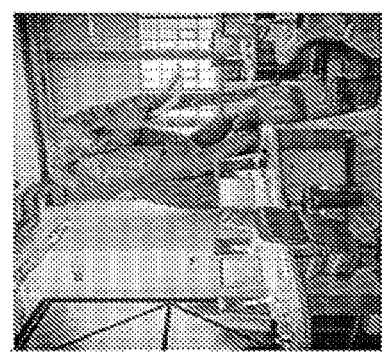
FIG. 4 shows example results of image tagging according to aspects of the present disclosure.

FIG. 4 shows example results of image tagging according to aspects of the present disclosure. An image 405 may be provided to an image processing apparatus as described with reference to FIGS. 1-3, and the same image 405 may be provided to another image tagger. The table 410 shows the tags returned by the image processing apparatus, and the table 415 shows the tags returned by the other image tagger. The image processing apparatus may be trained with training data including image-tag pairs curated based on semantic filtering and behavioral filtering. For instance, a semantic and behavioral data filtering scheme may be applied to a stock dataset, and the image processing apparatus may be trained on a resulting dataset (e.g., including 240M image-tag pairs).

In some examples, the image processing apparatus may be referred to as a concept tagger model, and the other image tagger may be a state-of-the-art image tagging model. As shown in the table 410, the image processing apparatus produces precise image tags given an image 405. For instance, although the tag 'Zoo' produced by the other image tagger may be related to an elephant, the tags 'Desk,' 'Computer,' and 'Room' produced by the image processing apparatus may be more relevant to the image 405 (e.g., since the image 405 depicts the 'elephant in the room'). If the image 405 is a part of training data used to train the image processing apparatus, and a user provided a tag of 'forest' for the image, the 'forest' tag may be filtered out of the training data. For instance, during semantic filtering, the image processing apparatus may determine that the semantic similarity of the tag 'forest' and the image 405 is low, and the image processing apparatus may discard the 'forest' tag from the training data.

Training

A method, apparatus, non-transitory computer-readable medium, and system for machine learning for image tagging is described. One or more aspects of the method, apparatus, non-transitory computer-readable medium, and system include encoding an image and a tag of the image using a multimodal encoder to obtain an image embedding and a text embedding, respectively; generating training data for a machine learning model by filtering a plurality of image-tag pairs based on a similarity between the image embedding and the text embedding; and training the machine learning model using the training data.

Some examples of the method, apparatus, non-transitory computer readable medium, and system further include computing a similarity score between the image embedding and the text embedding, wherein the filtering is based on the similarity score.

Some examples of the method, apparatus, non-transitory computer readable medium, and system further include obtaining user-interaction data for the image and the tag, wherein the filtering is further based on the user-interaction data.

Some examples of the method, apparatus, non-transitory computer readable medium, and system further include computing, based on the user-interaction data, a behavioral score indicating user interactions with the image in response to searches corresponding to the tag, wherein the filtering is based on the behavioral score.

Some examples of the method, apparatus, non-transitory computer readable medium, and system further include receiving the image and the tag of the image from a user upload.

Some examples of the method, apparatus, non-transitory computer readable medium, and system further include identifying a set of frequently-used tags. Some examples further include selecting the plurality of image-tag pairs based on the set of frequently-used tags.

Some examples of the method, apparatus, non-transitory computer readable medium, and system further include computing an offensiveness value for the image or the tag. Some examples further include selecting the plurality of image-tag pairs based on the offensiveness value.

Some examples of the method, apparatus, non-transitory computer readable medium, and system further include computing an editorial value for the image or the tag. Some examples further include selecting the plurality of image-tag pairs based on the editorial value.

Some examples of the method, apparatus, non-transitory computer readable medium, and system further include obtaining an additional image. Some examples further include generating an additional tag for the additional image using the machine learning model.

A method, apparatus, non-transitory computer-readable medium, and system for machine learning for image tagging is described. One or more aspects of the method, apparatus, non-transitory computer-readable medium, and system include obtaining user-interaction data for an image and a tag of the image; generating training data for a machine learning model by filtering a plurality of image-tag pairs based on the user-interaction data; and training the machine learning model using the training data.

Some examples of the method, apparatus, non-transitory computer readable medium, and system further include computing, based on the user-interaction data, a behavioral score indicating user interactions with the image in response to searches corresponding to the tag, wherein the filtering is based on the behavioral score.

Some examples of the method, apparatus, non-transitory computer readable medium, and system further include encoding the image and the tag using a multimodal encoder to obtain an image embedding and a text embedding, respectively, wherein the filtering is further based on a similarity between the image embedding and the text embedding.

Some examples of the method, apparatus, non-transitory computer readable medium, and system further include computing a similarity score between the image embedding and the text embedding, wherein the filtering is based on the similarity score.

Figure 5:
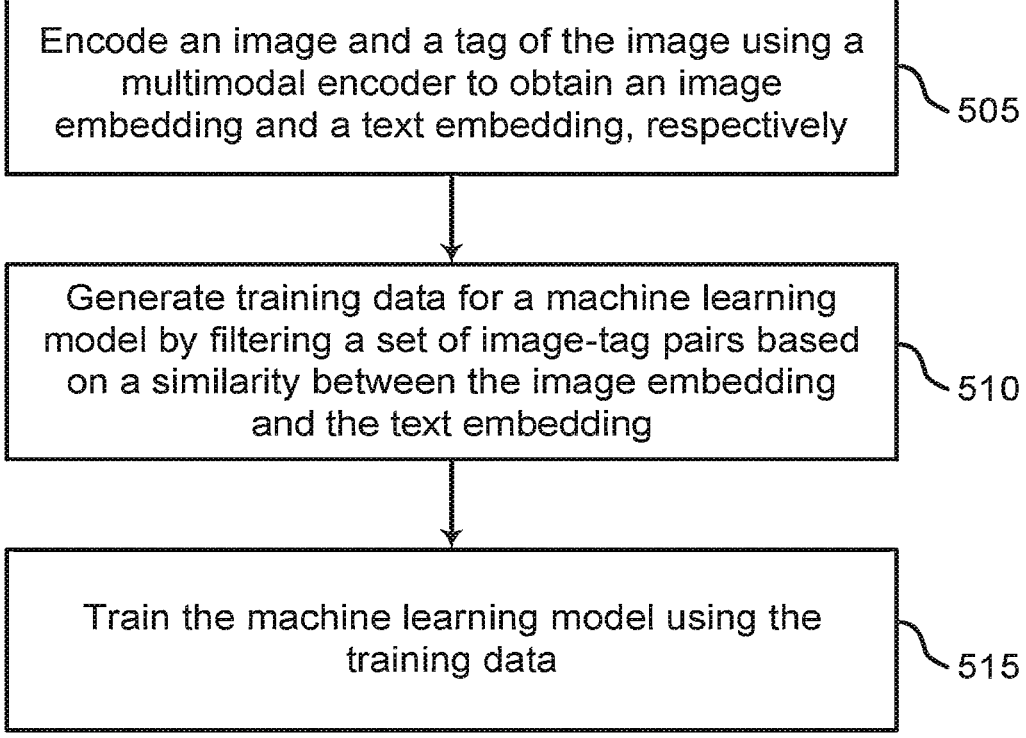
FIGS. 5 and 6 show examples of methods for machine learning according to aspects of the present disclosure.

FIG. 5 shows an example of a method 500 for machine learning according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system encodes an image and a tag of the image using a multimodal encoder to obtain an image embedding and a text embedding, respectively. In some examples, the image embedding (e.g., an image vector) and the text embedding (e.g., a text vector) may be in a same embedding space (e.g., a same vector space). In some cases, the operations of this step refer to, or may be performed by, a semantic filtering component as described with reference to FIG. 2.

At operation 510, the system generates training data for a machine learning model by filtering a set of image-tag pairs based on a similarity between the image embedding and the text embedding. In some examples, the similarity between the image embedding and the text embedding may be based on a closeness of the image embedding and the text embedding in an embedding space. In some cases, the operations of this step refer to, or may be performed by, a semantic filtering component as described with reference to FIG. 2.

At operation 515, the system trains the machine learning model using the training data. Because the training data may be filtered based on semantic similarity between image-tag pairs, the machine learning model may learn to associate tags and images that are semantically similar to each other. In some cases, the operations of this step refer to, or may be performed by, a training component as described with reference to FIG. 2.

Figure 6:
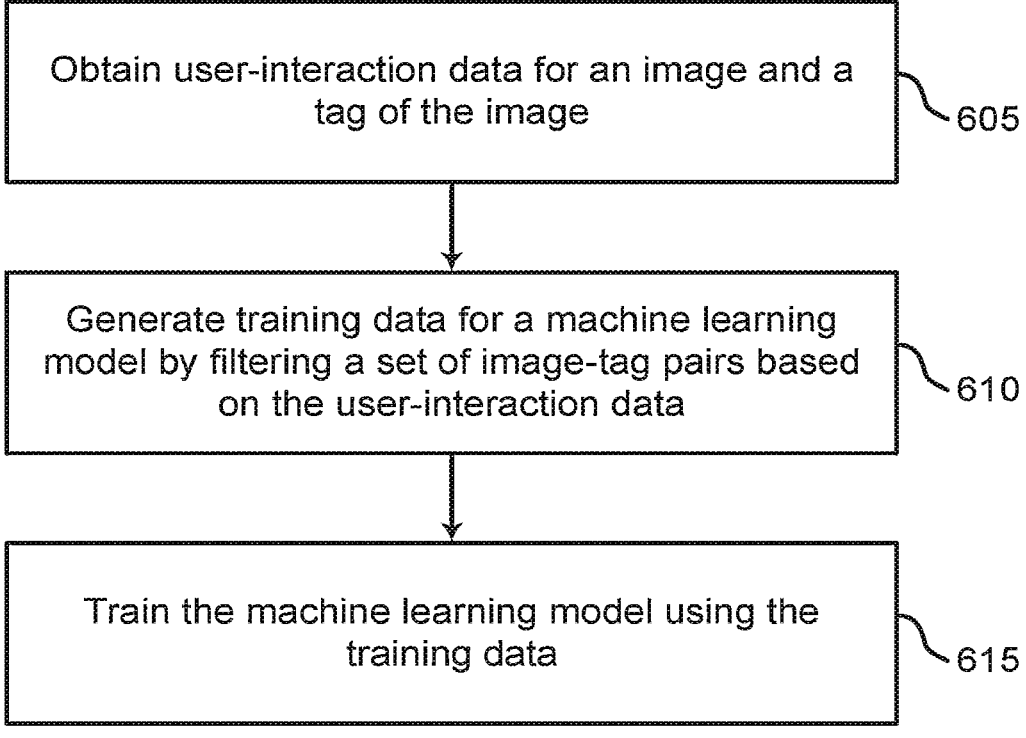

FIG. 6 shows an example of a method 600 for machine learning according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system obtains user-interaction data for an image and a tag of the image. The user-interaction data may correspond to user click-through data for the image-tag pair and may specify, for example, a number of times a user submitted a search query with the tag and selected the image based on the search query. In some cases, the operations of this step refer to, or may be performed by, a behavioral filtering component as described with reference to FIG. 2.

At operation 610, the system generates training data for a machine learning model by filtering a set of image-tag pairs based on the user-interaction data. For instance, the system may include an image-tag pair in the training data if the score for the image-tag pair is greater than some threshold (e.g., if the score for the image-tag pair is greater than the scores for a threshold number of image-tag pairs with the same tag). In some cases, the operations of this step refer to, or may be performed by, a behavioral filtering component as described with reference to FIG. 2.

At operation 615, the system trains the machine learning model using the training data. Because the training data may be filtered based on user behavior, the machine learning model may learn to associate tags and images that are related to each other according to user behavior. In some cases, the operations of this step refer to, or may be performed by, a training component as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, micro-controller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A computer-implemented method of training a neural network for image processing, the method comprising:

obtaining a plurality of image-tag pairs including an image-tag pair comprising an image and a tag associated with the image;

encoding the image and the tag associated with the image using a multimodal encoder to obtain an image embedding and a text embedding, respectively, in a common embedding space;

generating training data for a machine learning model comprising an artificial neural network (ANN) by computing a similarity score between the image embedding and the text embedding, comparing the similarity score to a threshold, and filtering the plurality of image-tag pairs based on the comparison, wherein the similarity score represents a semantic similarity between the image and the tag of the image-tag pair based on a similarity between the image embedding and the text embedding in the common embedding space; and training the machine learning model to perform image processing by updating parameters of the ANN using the training data.

2. The method of claim 1, further comprising:

obtaining user-interaction data for the image and the tag, wherein the filtering is further based on the user-interaction data.

3. The method of claim 2, further comprising:

computing, based on the user-interaction data, a behavioral score indicating user interactions with the image in response to searches corresponding to the tag, wherein the filtering is based on the behavioral score.

4. The method of claim 1, further comprising:

receiving the image and the tag of the image from a user upload.

5. The method of claim 1, further comprising:

identifying a set of frequently-used tags; and selecting the plurality of image-tag pairs based on the set of frequently-used tags.

6. The method of claim 1, further comprising:

computing an offensiveness value for the image or the tag; and selecting the plurality of image-tag pairs based on the offensiveness value.

7. The method of claim 1, further comprising:

computing an editorial value for the image or the tag; and selecting the plurality of image-tag pairs based on the editorial value.

8. The method of claim 1, further comprising:

obtaining an additional image; and generating an additional tag for the additional image using the machine learning model.

9. A system comprising:

a memory component; and a processing device coupled to the memory component, the processing device configured to perform image processing using a machine learning model, wherein the machine learning model is trained by:

obtaining a plurality of image-tag pairs including an image-tag pair comprising an image and a tag associated with the image;

encoding the image and the tag associated with the image using a multimodal encoder to obtain an image embedding and a text embedding, respectively, in a common embedding space;

generating training data for a machine learning model comprising an artificial neural network (ANN) by computing a similarity score between the image embedding and the text embedding, comparing the similarity score to a threshold, and filtering the plurality of image-tag pairs based on the comparison, wherein the similarity score represents a semantic similarity between the image and the tag of the image-tag pair based on a similarity between the image embedding and the text embedding in the common embedding space; and training the machine learning model to perform image processing by updating parameters of the ANN using the training data.

10. The system of claim 9, further comprising:

obtaining user-interaction data for the image and the tag, wherein the filtering is further based on the user-interaction data.

11. The system of claim 10, further comprising:

computing, based on the user-interaction data, a behavioral score indicating user interactions with the image in response to searches corresponding to the tag, wherein the filtering is based on the behavioral score.

12. The system of claim 9, further comprising:

receiving the image and the tag of the image from a user upload.

13. The system of claim 9, further comprising:

identifying a set of frequently-used tags; and selecting the plurality of image-tag pairs based on the set of frequently-used tags.

14. The system of claim 9, further comprising:

computing an offensiveness value for the image or the tag; and selecting the plurality of image-tag pairs based on the offensiveness value.

15. The system of claim 9, further comprising:

computing an editorial value for the image or the tag; and selecting the plurality of image-tag pairs based on the editorial value.

16. The system of claim 9, further comprising:

obtaining an additional image; and generating an additional tag for the additional image using the machine learning model.

\* \* \* \* \*